(12) United States Patent
Wu et al.

(10) Patent No.: US 11,745,632 B2
(45) Date of Patent: Sep. 5, 2023

(54) FOLDING LIFTING DEVICE FOR AUTOMOBILE

(71) Applicant: NINGBO SHUAITELONG GROUP CO., LTD., Ningbo (CN)

(72) Inventors: Zhiguang Wu, Ningbo (CN); Bingfa Wu, Ningbo (CN); Lixian Wang, Ningbo (CN); Xiaopeng Cao, Ningbo (CN)

(73) Assignee: NINGBO SHUAITELONG GROUP CO., LTD., Ningbo (CN)

( * ) Notice: Subject to any disclaimer, the term of this patent is extended or adjusted under 35 U.S.C. 154(b) by 0 days.

(21) Appl. No.: 17/758,118

(22) PCT Filed: Oct. 10, 2020

(86) PCT No.: PCT/CN2020/120197
§ 371 (c)(1),
(2) Date: Jun. 28, 2022

(87) PCT Pub. No.: WO2021/143218
PCT Pub. Date: Jul. 22, 2021

(65) Prior Publication Data
US 2023/0047817 A1    Feb. 16, 2023

(30) Foreign Application Priority Data

Jan. 13, 2020    (CN) .................. 202010030685.X

(51) Int. Cl.
*B60N 3/10*    (2006.01)
*B66F 11/04*    (2006.01)

(52) U.S. Cl.
CPC ............ *B60N 3/106* (2013.01); *B66F 11/042* (2013.01)

(58) Field of Classification Search
CPC .............................. B60N 3/106; B66F 11/042
See application file for complete search history.

(56) References Cited

U.S. PATENT DOCUMENTS 9,840,179 B2 *  12/2017  Sawada .................. B60N 3/106
10,099,594 B2 *  10/2018  Salinas .................. B60N 3/105
(Continued)

FOREIGN PATENT DOCUMENTS

CN    101311030 A    11/2008
CN    202624017 U    12/2012
(Continued)

OTHER PUBLICATIONS

International Search Report dated Jan. 14, 2021 from PCT Application No. PCT/CN2020/120197, 8 pages.

*Primary Examiner* — Anita M King
(74) *Attorney, Agent, or Firm* — INNOVATION CAPITAL LAW GROUP, LLP; Vic Lin

(57) ABSTRACT

A folding lifting device for automobile, comprising outer housing, lifting supporting plate, folding assembly and synchronous cushioning assembly. Outer housing comprises housing bottom, lifting supporting plate is provided in outer housing, and folding assembly is provided between lower side of lifting supporting plate and upper side of housing bottom; folding assembly is composed of two groups of same side V-shaped folding elements, and synchronous cushioning assembly is provided between lower sides of two groups of side V-shaped folding elements. Each of two groups of side V-shaped folding elements comprises front upper folding bar, front lower folding bar, rear upper folding bar and rear lower folding bar; first synchronous rack is fixedly provided at rear side of front lower folding bar, second synchronous rack is fixedly provided at the front side of the rear lower folding bar.

10 Claims, 14 Drawing Sheets

(56) References Cited

U.S. PATENT DOCUMENTS

| | | | |
|---|---|---|---|
| 10,640,028 B2 * | 5/2020 | Koarai | B60N 3/106 |
| 11,001,184 B2 * | 5/2021 | Kotsuji | A47G 23/0216 |
| 2013/0038097 A1 * | 2/2013 | Oldani | B60N 3/102 |
| | | | 297/188.14 |
| 2018/0215301 A1 | 8/2018 | Smithson et al. | |

FOREIGN PATENT DOCUMENTS

| | | | |
|---|---|---|---|
| CN | 104963984 A | | 10/2015 |
| CN | 206384783 U | | 8/2017 |
| CN | 206870912 U | | 1/2018 |
| CN | 208530380 U | | 2/2019 |
| CN | 208682699 U | | 4/2019 |
| CN | 209493096 U | | 10/2019 |
| CN | 110422092 A | | 11/2019 |
| CN | 110667451 A | | 1/2020 |
| CN | 110817042 A | | 2/2020 |
| CN | 112265485 B | * | 4/2021 |
| CN | 114604156 A | * | 6/2022 |
| JP | 2008221992 A | | 9/2008 |
| KR | 20070095723 A | | 10/2007 |

* cited by examiner

US 11,745,632 B2

FOLDING LIFTING DEVICE FOR AUTOMOBILE

TECHNICAL FIELD

The invention relates to a lifting device, in particular to a folding lifting device featuring a reasonable structure, stable lifting, a smaller size and a larger lifting span, which can be used for a cup holder for an automobile.

BACKGROUND ART

A cup holder or cup stand is an essential accessory of automobiles. Manufacturers in the field of automobile parts invest a lot of manpower and financial resources to develop, design and produce such an automobile accessory.

The utility model with Patent No. 201821311209.X discloses a lifting double cup holder, which is characterized in that the lifting double cup holder comprises a cover, a base and a partition, wherein the base defines a receiving space for receiving cups or bottles, and the cover moves relative to the base between a raised position covering the receiving space and a lowered position below the receiving space to support the cups or bottles. When the cover moves from the raised position to the lowered position, the partition moves from a receding position outside the receiving space to an action position entering the receiving space to divide it into two subspaces. As shown in the specification and drawings, a first connecting rod and a second connecting rod are hinged together in the middle to form an X-shape, and the X-shape is folded or unfolded by increasing or decreasing the vertical and horizontal distances between the ends of the connecting rods, so as to realize lifting. However, due to the limited width of the cup holder, the lifting height is also very limited. For example, in a cup holder with a diameter of 90 mm, the maximum lifting height is only about 35 mm. Therefore, the lifting effect is poor.

The invention with Patent No. 200710169551.0 discloses a sinking type cup stand for a motor vehicle, which comprises a supporting case, a lifter housing which can move in the supporting case, a cup tray which can move in the lifter housing, and a lifting unit which moves the lifter housing and the cup tray in opposite directions. Although the technical scheme can be implemented, the structure and the manufacture and assembly processes are too complicated. The more complex the structure, the higher the failure rate. Besides, the space occupied outside the cup stand is too large.

The utility model with Patent No. 201720530760.2 discloses a lifting cup holder device for an automobile, which comprises a cup holder and a lifting platform, and is characterized in that the lifting platform comprises a supporting plate and props respectively fixed on two sides of a bottom of the supporting plate, a damping pull rod is fixed in the middle of the bottom of the supporting plate, the damping pull rod and the props pass through a bottom plate of the cup holder, the props are sleeved with compression springs, and two ends of each compression spring respectively abut against the bottom plate of the cup holder and the supporting plate. Although the technical scheme can be implemented, a large space is required for the lower section, and technical content is low.

According to a cup holder sample in the prior art, an arc-shaped rack is arranged at a lower end, which is movably connected to a lower side of a lifting supporting plate by means of a bottom hole in a bottom plate of an outer housing, and a damper is installed on a lower side of the bottom plate of the outer housing and engages with the arc-shaped rack for transmission. Because the arc-shaped rack will move in the horizontal direction when moving vertically, the damper also moves in the horizontal direction. Therefore, the connection is complicated. A spiral spring is arranged between the bottom plate of the outer housing and the lifting supporting plate, and when the lifting supporting plate descends, the arc-shaped rack extends to a lower end of one side, which reduces a space required for the lower section, but increases a space required for one side. Besides, lifting stability is not very good.

In view of this, those skilled in the art in the company intend to develop a folding lifting device for a cup holder of an automobile, which features a simple and reasonable structure, better stability and higher lifting efficiency.

SUMMARY OF THE INVENTION

The technical problem to be solved by the invention is to provide a folding lifting device for an automobile, which features a more stable structure, a smaller size and higher lifting efficiency.

The folding lifting device for an automobile comprises an outer housing, a lifting supporting plate, a folding assembly, and a synchronous cushioning assembly. The outer housing comprises a housing bottom, the lifting supporting plate is movably disposed in the outer housing, and the folding assembly is disposed between a lower side of the lifting supporting plate and an upper side of the housing bottom.

The folding assembly is composed of two groups of side V-shaped folding elements which are disposed in a front-rear symmetry manner, and the synchronous cushioning assembly is disposed between lower sides of the two groups of side V-shaped folding elements.

Each of the two groups of side V-shaped folding elements disposed in the front-rear symmetry manner comprises a front upper folding bar, a front lower folding bar pivotally connected to the front upper folding bar, a rear upper folding bar, and a rear lower folding bar pivotally connected to the rear upper folding bar. Upper ends of the front upper folding bar and the rear upper folding bar are pivotally connected to the lower side of the lifting supporting plate, and lower ends of the front lower folding bar and the rear lower folding bar are pivotally connected to the upper side of the housing bottom. The synchronous cushioning assembly comprises a first synchronous rack and a second synchronous rack, the first synchronous rack is fixedly provided at a rear lower side of the front lower folding bar, the second synchronous rack is fixedly provided at a front lower side of the rear lower folding bar, and the first synchronous rack and the second synchronous rack are the same in tooth model, and are in mutual engagement transmission.

In a further preferred scheme of the invention, the two groups of side V-shaped folding elements disposed in the front-rear symmetry manner are completely the same, the synchronous cushioning assembly is provided with a speed change gear and a damper, the first synchronous rack is arc-shaped, and a pivotal connection point at the lower end of the front lower folding bar is a circular center of the arc-shaped first synchronous rack.

The second synchronous rack is arc-shaped, a pivotal connection point at the lower end of the rear lower folding bar is a circular center of the arc-shaped second synchronous rack, and the first synchronous rack and the second synchronous rack have the same radius.

In a further preferred scheme of the invention, tension springs are respectively arranged at pivotal connection positions of the two groups of side V-shaped folding elements disposed in the front-rear symmetry manner, and the tension springs keep the folding elements in an extended state.

In a further preferred scheme of the invention, a mechanical hole is formed in the housing bottom, a mechanical mounting rack is fixedly arranged in front of the mechanical hole in the housing bottom, and a speed change gear is movably arranged in the mechanical mounting rack; and the speed change gear consists of a pinion and a big gear which are fixedly overlapped, the pinion engages with the first synchronous rack for transmission, and the big gear engages with a damping gear in the damper for transmission.

In a further preferred scheme of the invention, a plurality of groups of clamping assemblies are regularly arranged around the outer housing, and each of the plurality of groups of clamping assemblies consists of a cup clamp at an upper end, a limiting linkage block at a lower end and a spring connecting bar connecting the cup clamp and the limiting linkage blocktogether; and clamp holes, limiting holes and spring connecting bar grooves are formed in the outer housing corresponding to the clamping assemblies, upper ends of the limiting linkage blocks are pivotally connected to two sides of the limiting holes, stress springs are arranged at lower ends of the spring connecting bars, and the stress springs keep ejecting upper ends of the clamping assemblies outwards.

In a further preferred scheme of the invention, one side of the outer housing is provided with an internal pressing type stepless locking assembly, a ratchet bar is fixedly arranged at a rear side of the first synchronous rack and is arc-shaped, and the arc-shaped ratchet bar and the arc-shaped first synchronous rack have the same circular center; and a plurality of limiting ratchet teeth are arranged at an upper end of the ratchet bar, an automatic lifting area is arranged under the plurality of limiting ratchet teeth, and a highest limiting buckle is arranged under the automatic lifting area.

In a further preferred scheme of the invention, a lever groove, in which a lever bar is connected through a fulcrum shaft, is formed in one side of the outer housing, a moving stopper is fixed to a low side of the housing bottom, a translational locking bar is movably arranged in the moving stopper, and a lock catch for locking the limiting ratchet teeth is arranged at an inner end of the translational locking bar; and a lever connection hole is formed in an outer end of the translational locking bar, a lower end of the lever bar is inserted into the lever connection hole, an internal button is connected to an upper end of the lever bar, a return spring is fixedly arranged at an outer side of an upper opening of the outer housing outside the internal button, and the return spring keeps ejecting the internal button towards the inside of the outer housing.

In a further preferred scheme of the invention, a push-type stepless locking assembly, which comprises a lever unlocking bar and an unlocking pressing bar, is arranged at the lower side of the housing bottom, a lever mounting rack, in which a locking bar groove is formed, is fixedly arranged at the lower side of the housing bottom, a movable locking bar is pivotally connected in the locking bar groove, and an outer end of the movable locking bar abuts against an upper left side of the big gear; and a spring wire is obliquely arranged at an upper side of the movable locking bar, and the spring wire keeps pressing the outer end of the movable locking bar, so as to lock the big gear.

In a further preferred scheme of the invention, the lever mounting rack is movably sleeved with a lever unlocking bar, a mounting rack groove for the lever mounting rack to be sleeved with is formed in the lever unlocking bar, one end of the lever unlocking bar abuts against a lower side of the movable locking bar, and an unlocking pressing bar is connected to an upper side of the other end of the lever unlocking bar.

In a further preferred scheme of the invention, anti-slip bars are arranged at an upper side of the lifting supporting plate.

The folding lifting device for an automobile has the advantages of being simple and reasonable in structure, high in lifting stability and span, good in effect, and small in utilized space, and can be applied to various cup holders with different depths and different lifting spans.

BRIEF DESCRIPTION OF THE DRAWINGS

The invention will be described in further detail below with reference to the drawings and preferred embodiments, but those skilled in the art will appreciate that these drawings are drawn only for the purpose of explaining the preferred embodiments, and therefore should not be taken as a limitation on the scope of the invention.

DETAILED DESCRIPTION OF THE INVENTION

Figure 1:
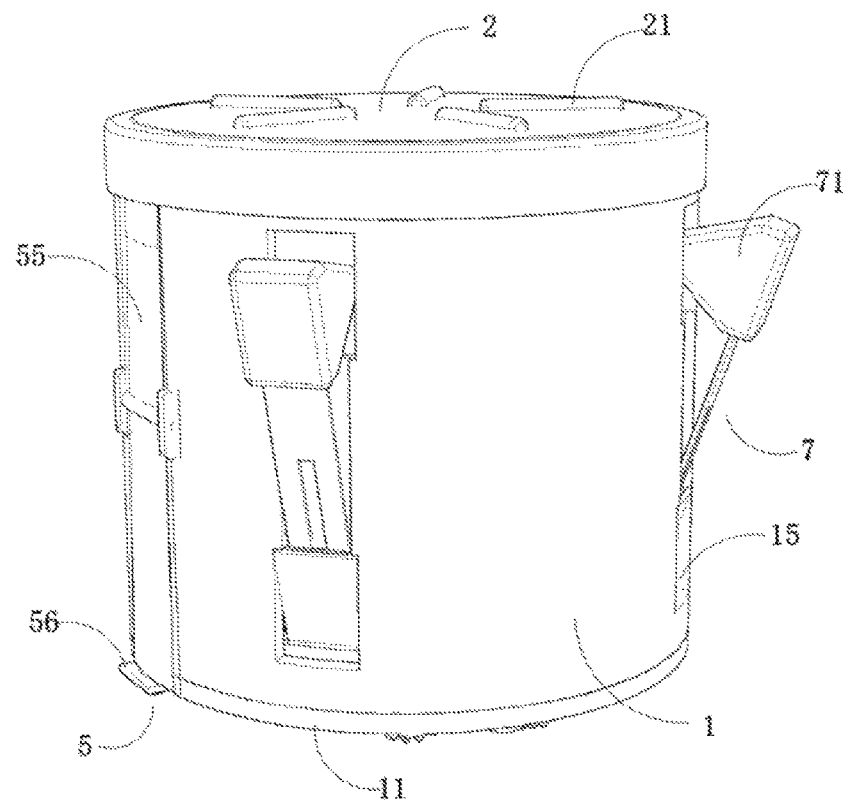
FIG. 1 is a perspective view showing that a lifting supporting plate is raised to serve as a panel according to the invention.
Figure 2:
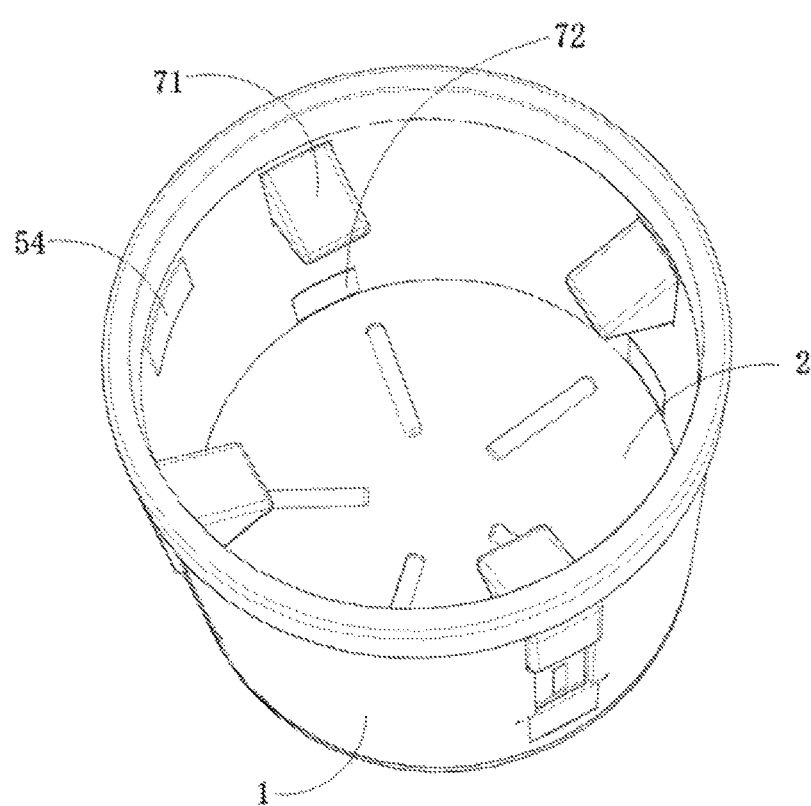
FIG. 2 is a perspective view showing that a lifting supporting plate is lowered for use according to the invention.
Figure 3:
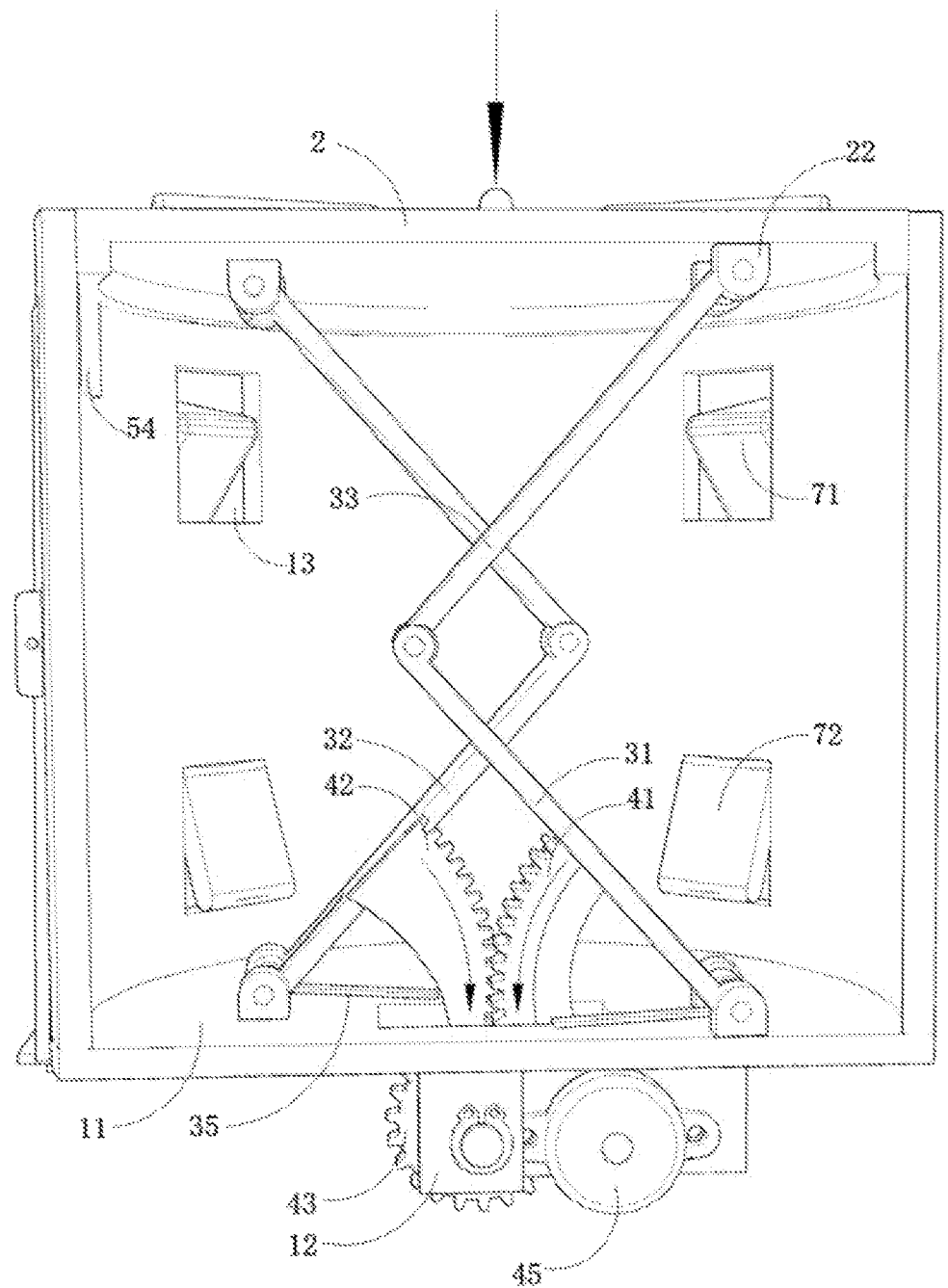
FIG. 3 is a cross-sectional perspective view and downward folding diagram of the invention.
Figure 4:
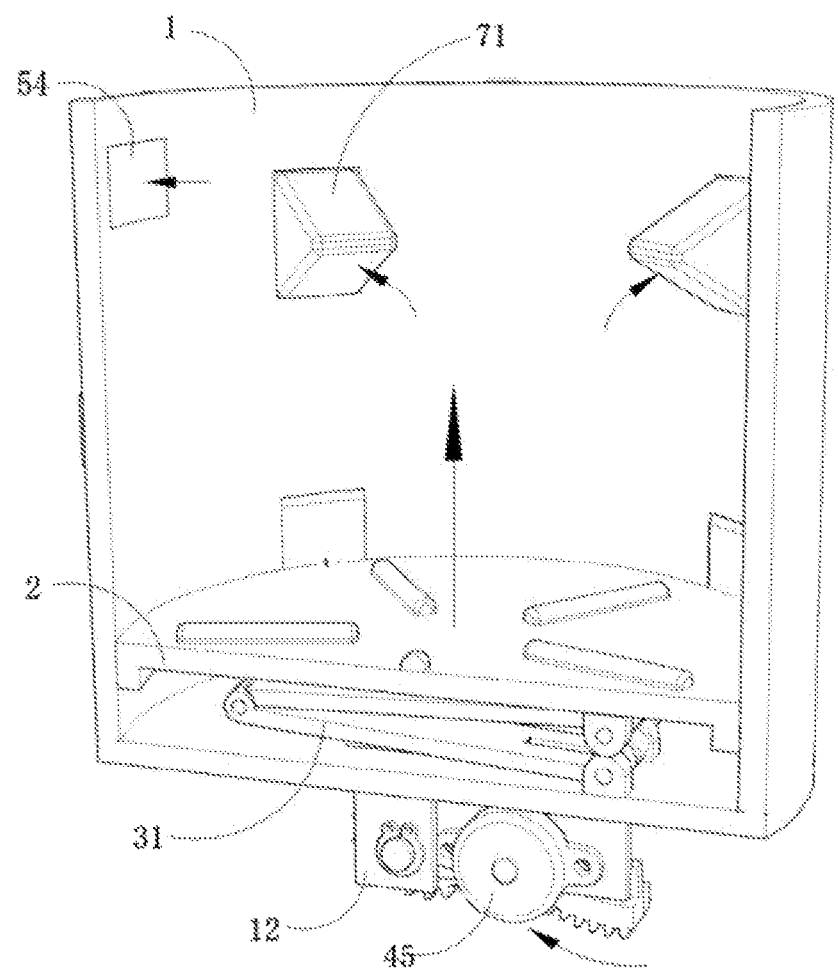
FIG. 4 is a cross-sectional perspective view in a folded state and an expanding and ascending diagram of the invention.
Figure 5:
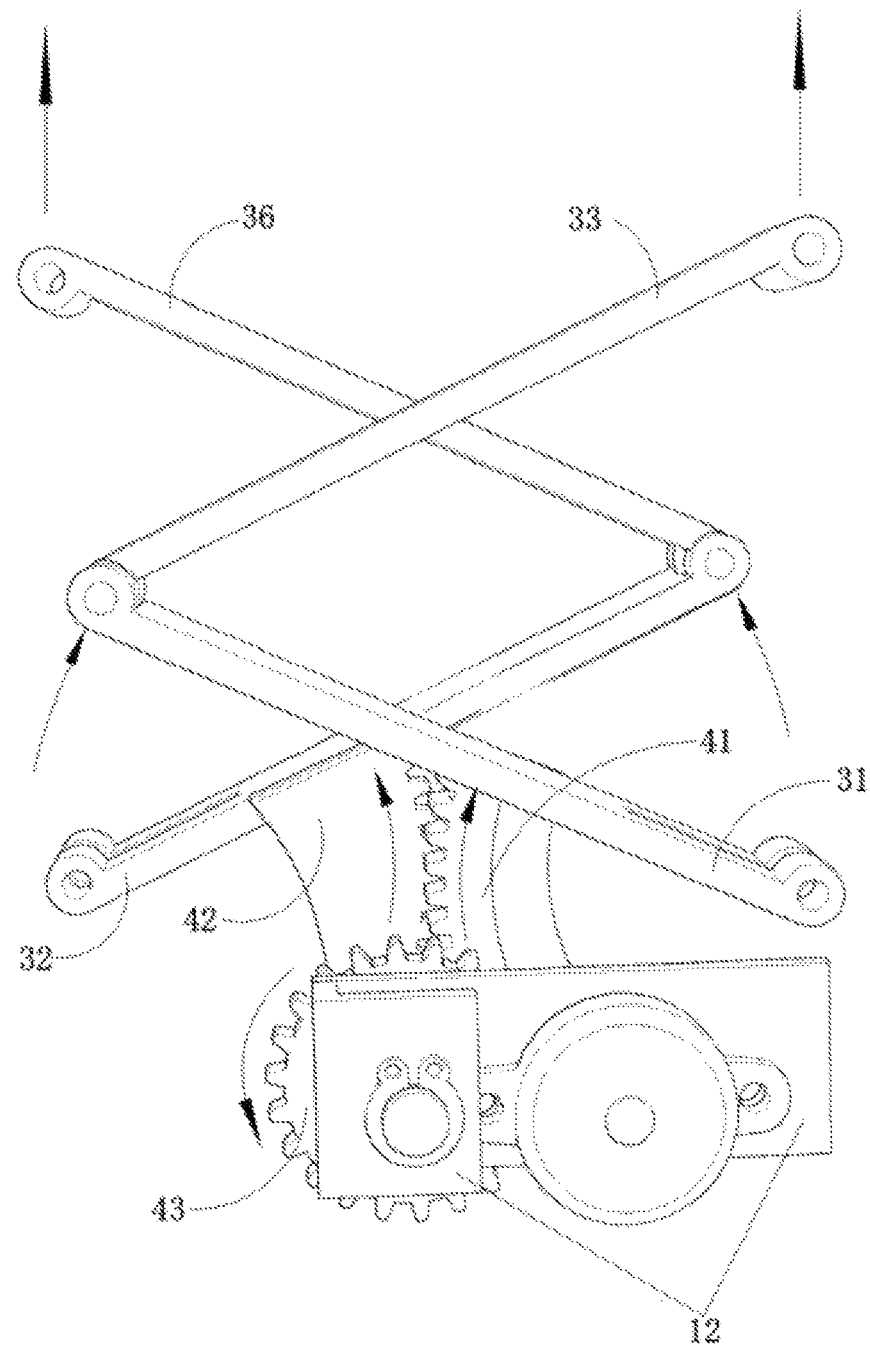
FIG. 5 is a perspective view of a folding assembly and a synchronous cushioning assembly of the invention in an ascending state.

The invention will be described in further detail below with reference to the attached drawings and embodiments. Those skilled in the art will appreciate that these descriptions are only descriptive and exemplary, and should not be construed as limiting the scope of protection of the invention.

In the description of the invention, it should be noted that the orientation or position relationships indicated by the terms "upper", "lower", "front", "rear", "inner", "outer", "left", and "right" are based on the orientation or position relationships shown in the drawings, only for convenience of describing the present invention and simplifying the description, and do not indicate or imply that the indicated device or assembly must have a specific orientation, or be constructed and operate in a specific orientation, and therefore cannot be understood as a limitation of the invention.

Figure 6:
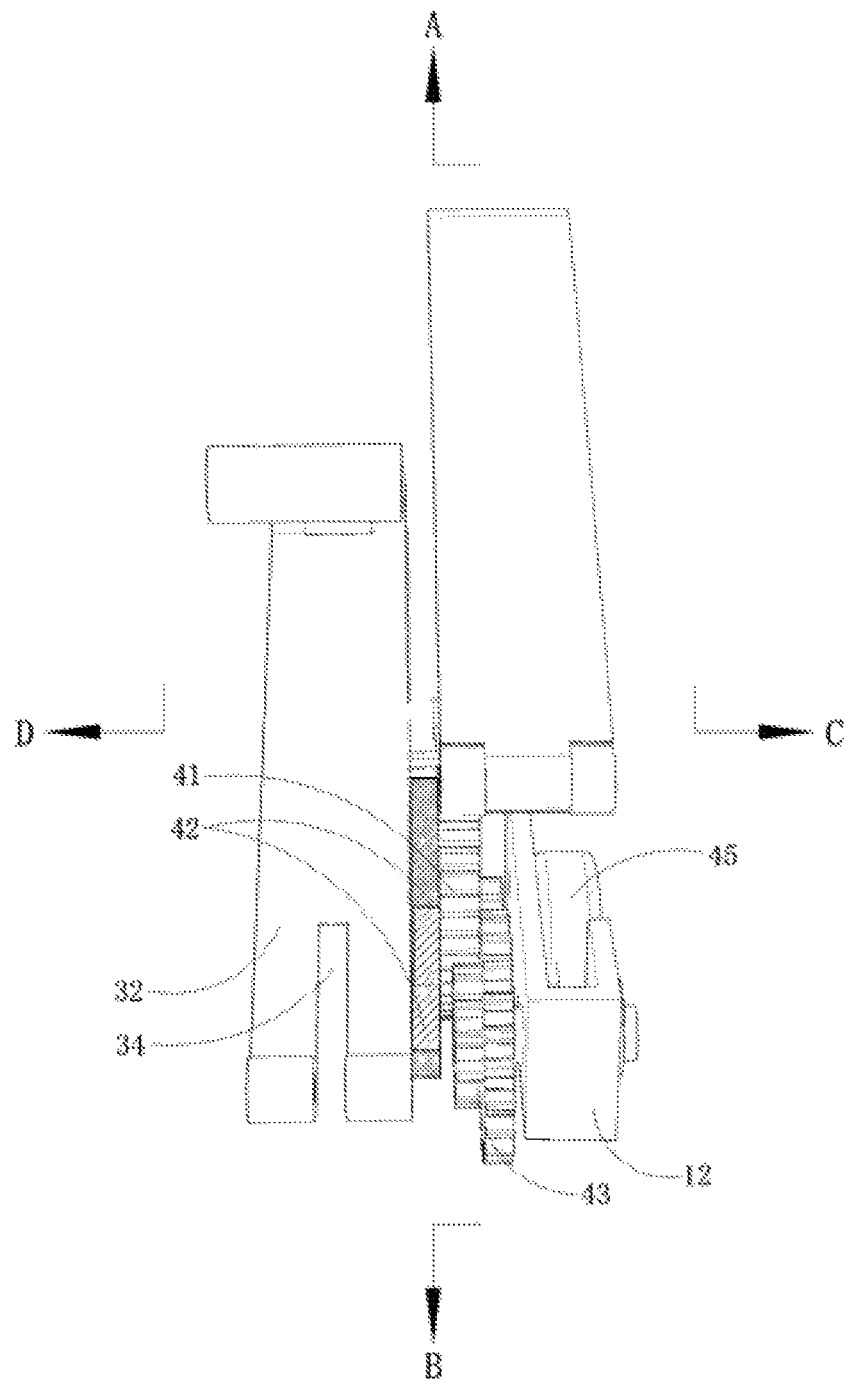
FIG. 6 is a side perspective view of a folding assembly and a synchronous cushioning assembly of the invention.

As shown in FIGS. 1 and 6: A, top; B, bottom; C, front; D, rear.

1, outer housing; 2, lifting supporting plate; 5, internal pressing type stepless locking assembly; 6, push-type stepless locking assembly; 7, clamping assembly;

11, housing bottom; 12, mechanical mounting rack; 13, clamp hole; 14, mechanical hole; 15, limiting hole; 17, lever groove; 19, return spring;

21, anti-slip bar; 22, folding pivotal connector;

31, front lower folding bar; 32, rear lower folding bar; 33, front upper folding bar; 34, spring groove; 35, tension spring; 36, rear upper folding bar;

41, first synchronous rack; 42, second synchronous rack; 43, speed change gear; 45, damper; 46, damping gear; 47, speed change wheel mounting buckle;

51, ratchet bar; 52, automatic lifting area; 53, highest limiting buckle; 54, internal button; 55, lever bar; 56, translational locking bar; 57, lever connection hole; 58, fulcrum shaft; 59, moving stopper; 60, lock catch;

61, lever unlocking bar; 62, locking bar groove; 63, movable locking bar; 64, lever bar pivotal connection hole; 65, spring wire; 66, unlocking pressing bar; 67, lever mounting rack; 68, mounting rack groove; 69, locking bar pivotal connection hole;

71, cup clamp; 72, limiting linkage block; 73, spring connecting bar; 75, stress spring.

As shown in FIGS. 1 to 7, a folding lifting device for an automobile comprises an outer housing 1, a lifting supporting plate 2, a folding assembly, and a synchronous cushioning assembly. The outer housing 1 comprises a housing bottom 11, the lifting supporting plate 2 is movably disposed in the outer housing 1, and the folding assembly is disposed between a lower side of the lifting supporting plate 2 and an upper side of the housing bottom 11.

The folding assembly is composed of two groups of side V-shaped folding elements which are disposed in a front-rear symmetry manner, and the synchronous cushioning assembly is disposed between lower sides of the two groups of side V-shaped folding elements.

In an existing lifting type or expansion type mechanical structure, a base height, which is generally more than twice the net lifting or expansion height, is required. However, a lifting or expansion foundation of a folding mechanical structure is very low, that is, the height after folding is very low, but the span after expansion is very large, that is, the efficiency is very high. Because the relative width is used for supporting pivotal connection, the stability is good.

As shown in FIGS. 3-8, the two groups of side V-shaped folding elements disposed in the front-rear symmetry manner are completely the same and each comprise a front upper folding bar 33, a front lower folding bar 31 pivotally connected to the front upper folding bar, a rear upper folding bar 36, and a rear lower folding bar 32 pivotally connected to the rear upper folding bar. Upper ends of the front upper folding bar 33 and the rear upper folding bar 36 are pivotally connected to the lower side of the lifting supporting plate 2, and lower ends of the front lower folding bar 31 and the rear lower folding bar 32 are pivotally connected to the upper side of the housing bottom 11. The synchronous cushioning assembly comprises a first synchronous rack 41, a second synchronous rack 42, a speed change gear 43 and a damper 45, the first synchronous rack 41 is fixedly provided at a rear lower side of the front lower folding bar 31 and is arc-shaped, and a pivotal connection point at the lower end of the front lower folding bar 31 is a circular center of the arc-shaped first synchronous rack 41.

The second synchronous rack 42 is fixedly provided at a front lower side of the rear lower folding bar 32 and is arc-shaped, and a pivotal connection point at the lower end of the rear lower folding bar 32 is a circular center of the arc-shaped second synchronous rack 42.

The first synchronous rack 41 and the second synchronous rack 42 are the same in radius and tooth model, and are in mutual engagement transmission.

A space distance between the front lower folding bar 31 and the rear lower folding bar 32 is slightly larger than a thickness of the second synchronous rack 42, and the side V-shaped folding element can have a relative width such that folding lifting can be more stable. The folding assembly is pivotally connected to the lifting supporting plate 2 and the housing bottom 11 through folding pivotal connectors 22 respectively.

The folding pivotal connectors 22 can be integrally formed with the lifting supporting plate 2 and the housing bottom 11 respectively through injection molding. Under the action of the synchronous cushioning assembly, the lifting supporting plate 2 can rise and fall more smoothly and stably in the outer housing 1.

Figure 8:
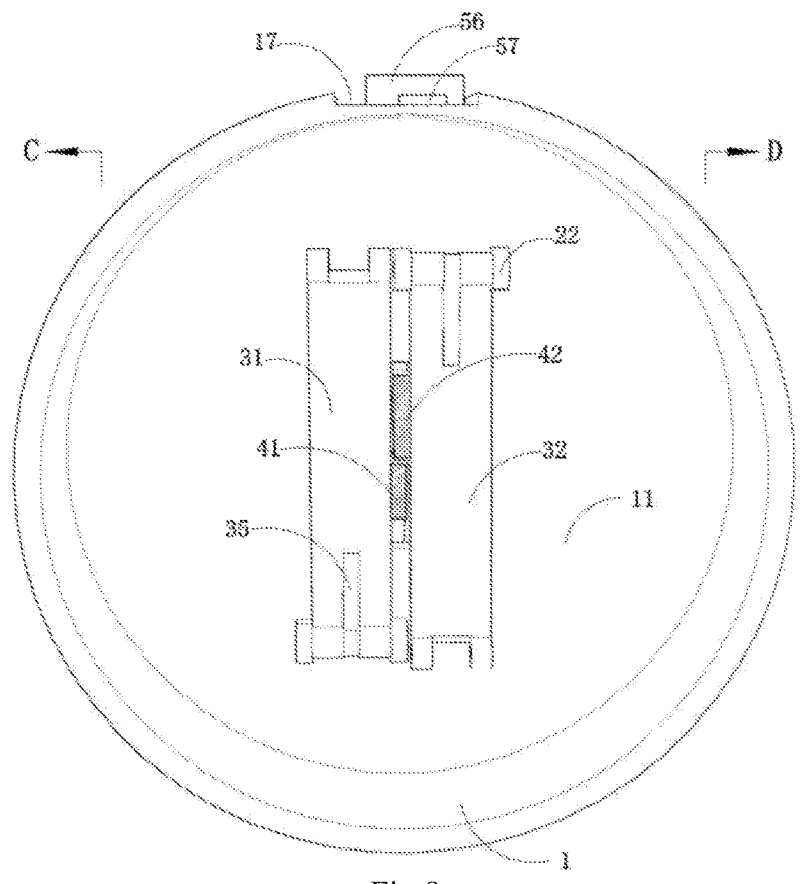
FIG. 8 is a partial top view of the invention.
Figure 9:
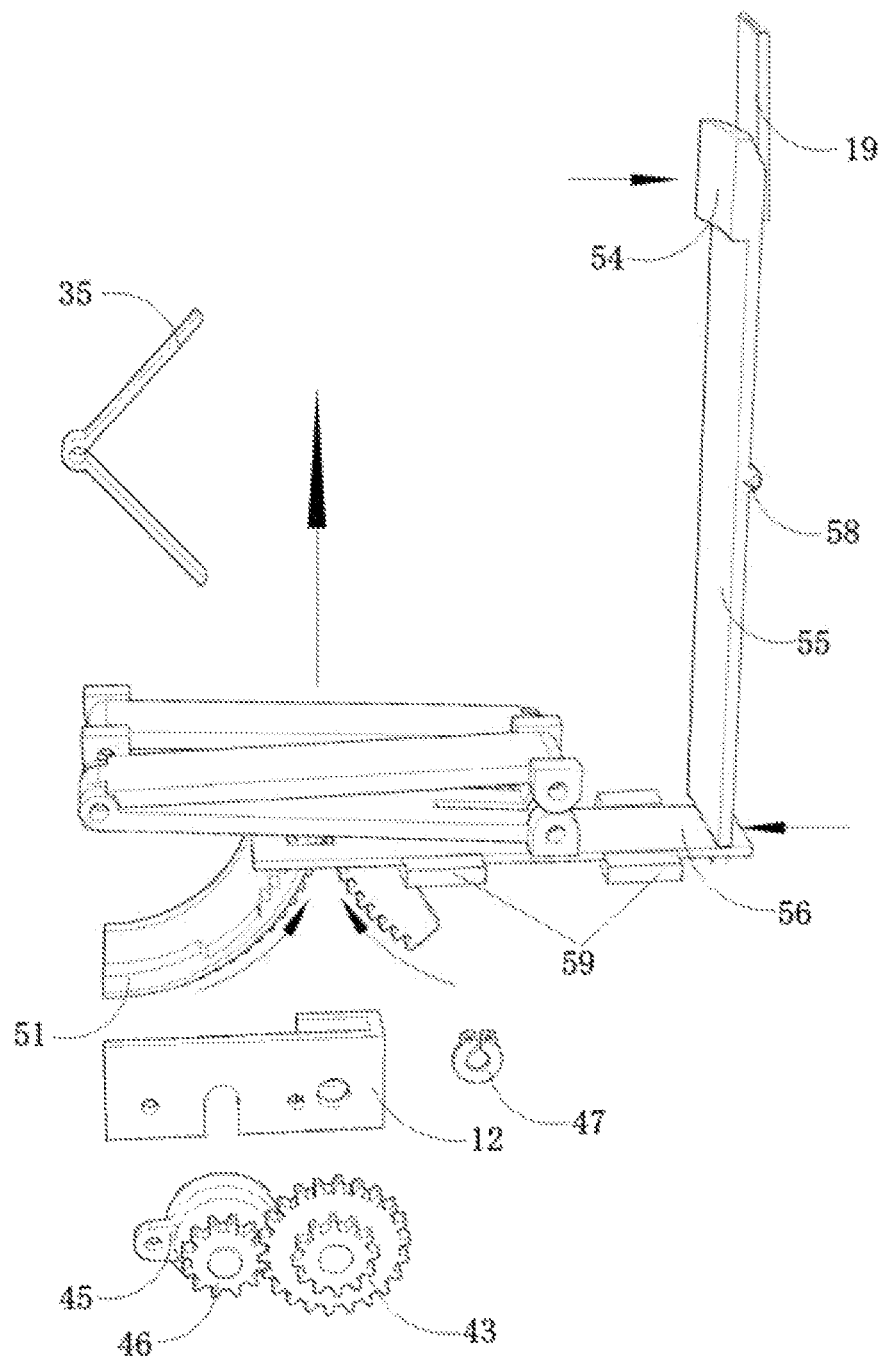
FIG. 9 is a partially exploded rear perspective view and an unlocking and ascending diagram of an internal pressing type stepless locking assembly of the invention.
Figure 10:
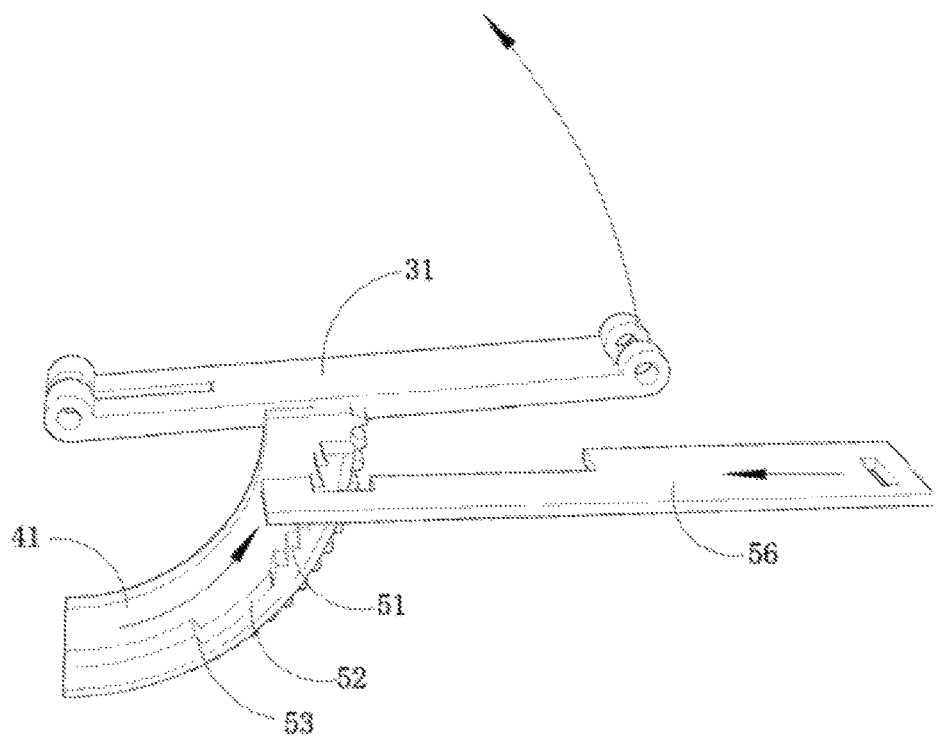
FIG. 10 is a rear view of a front lower folding bar and a ratchet bar and an unlocking and ascending diagram of part of an internal pressing type stepless locking assembly of the invention.
Figure 11:
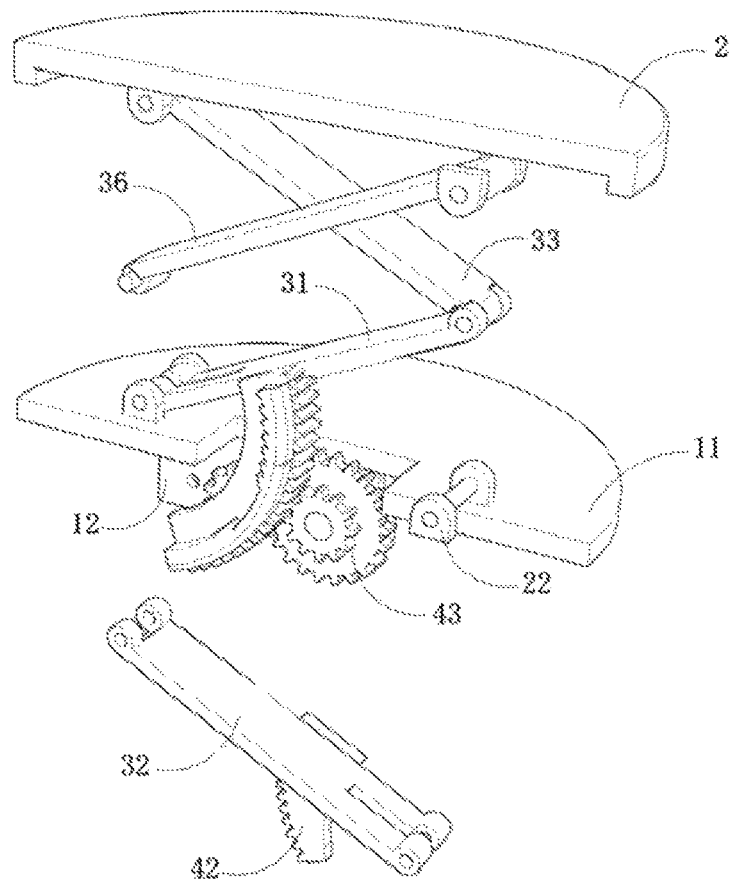
FIG. 11 is an exploded rear perspective view of a rear lower folding bar of the invention.

As shown in FIGS. 6, 8, and 9, tension springs 35 are arranged at pivotal connection positions of the two groups of side V-shaped folding elements disposed in the front-rear symmetry manner, and the tension springs 35 are located in spring grooves 34 at the pivotal connection positions. The tension springs 35 keep the folding assembly in an extended state, that is, the lifting supporting plate 2 is in an upward extended state. The tension springs 35 can also be arranged at any pair of pivotal connection positions at upper, middle and lower sides of the symmetrically arranged V-shaped folding elements, and can be symmetrically arranged at the lower end, or the upper end or the middle. As long as they are symmetrically arranged, tension will be balanced and lifting will be more stable. The total tension of the tension springs 35 needs to be larger than the total weight of a cup carried by the lifting supporting plate 2 to prevent automatic falling of the cup.

As shown in FIGS. 3-13 and FIG. 18, a mechanical hole 14 is formed in the housing bottom 11, a mechanical mounting rack 12 is fixedly arranged in front of the mechanical hole 14 in the housing bottom 11, and a speed change gear 43 is movably arranged in the mechanical mounting rack 12; and the speed change gear 43 consists of a pinion and a big gear which are fixedly overlapped, the pinion engages with the first synchronous rack 41 for transmission, and the big gear engages with a damping gear 46 in the damper 45 for transmission. One side of a center of the speed change gear 43 is provided with a rotating shaft which is movably arranged in the mechanical mounting rack 12, and an outer end of the rotating shaft is limited by a speed change gear mounting buckle 47.

A thickness of the first synchronous rack 41 is greater than that of the second synchronous rack 42, and the first synchronous rack 41 engages with the second synchronous rack 42 and the pinion in the speed change gear 43 for transmission. The arrangement of the speed change gear 43 and the damper 45 allows the lifting supporting plate 2 to slowly and steadily rise under the action of the tension springs 35 in the side V-shaped folding elements.

The damper 45 is a prior art and will not be described in detail in the invention.

As shown in FIGS. 1, 3, 4, and 14, a plurality of groups of clamping assemblies are regularly arranged around the outer housing 1, and each clamping assembly consists of a cup clamp 71 at an upper end, a limiting linkage block 72 at a lower end and a spring connecting bar 73 connecting the cup clamp 71 and the limiting linkage block 72 together; and clamp holes 13, limiting holes 15 and spring connecting bar grooves are formed in the outer housing 1 corresponding to the clamping assemblies, upper ends of the limiting linkage blocks 72 are pivotally connected to two sides of the limiting holes 15, stress springs 75 are arranged at lower ends of the spring connecting bars 73, and the stress springs 75 keep ejecting upper ends of the clamping assemblies 7 outwards.

Because a pivotal connection point of the limiting linkage block 72 is at the upper side, the clamping assembly 7 will automatically tilt under the action of the stress spring 75 without any external force, a lower end of the limiting linkage block 72 will extend into the outer housing 1, the cup clamp 71 connected to an upper end of the spring connecting bar 73 will be ejected to the outside of the outer housing with the pivotal connection point as a center point, and the ejection distance can be limited so as not to affect the lifting of the lifting supporting plate 2.

When the lifting supporting plate 2 is pressed down by an external force and locked, an edge of the lifting supporting plate 2 extrudes the lower end of the limiting linkage block 72, making the clamping assembly 7 vertical. At this point, the cup clamp 71 enters the outer housing 1, and under the action of the spring connecting bar 73, the cup clamp 71 has certain elasticity, which can stabilize the cup.

The structural technical design of the clamping assembly 7 is much simpler than the prior art. The design is based on the fact that the lifting supporting plate 2 needs to rise completely to be used as a panel of the outer housing 1. However, if the clamping assembly 7 of the invention is used in other single or double cup holders, and the lifting supporting plate 2 rises and falls within the middle and lower sections of the outer housing by certain heights and will not go up to the cup clamp 71, the clamping assembly 7 does not need to be provided with the lower limiting linkage block 72 and the stress spring 75, as long as the lower end of the spring connecting bar 73 is fixed to the lower end outside the outer housing.

Figure 7:
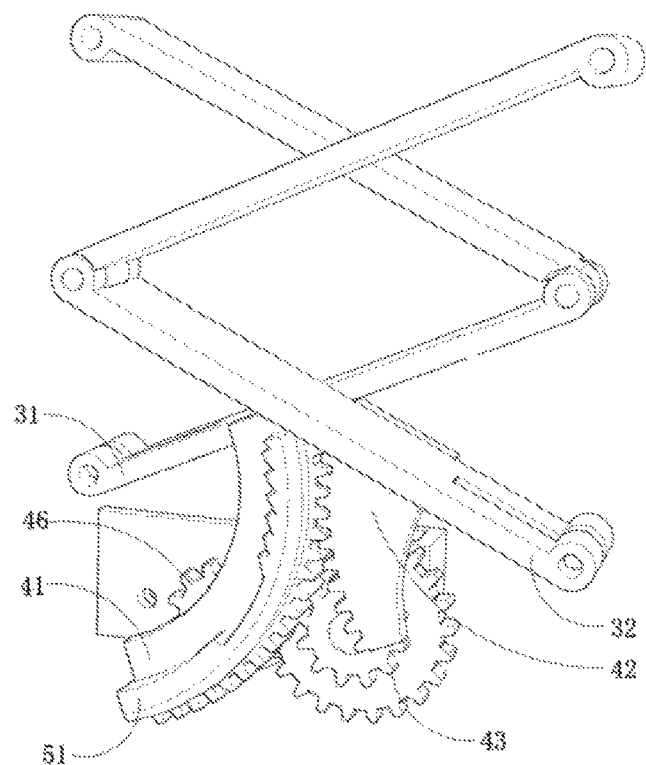
FIG. 7 is a rear perspective view of a folding assembly and a synchronous cushioning assembly of the invention.
Figure 12:
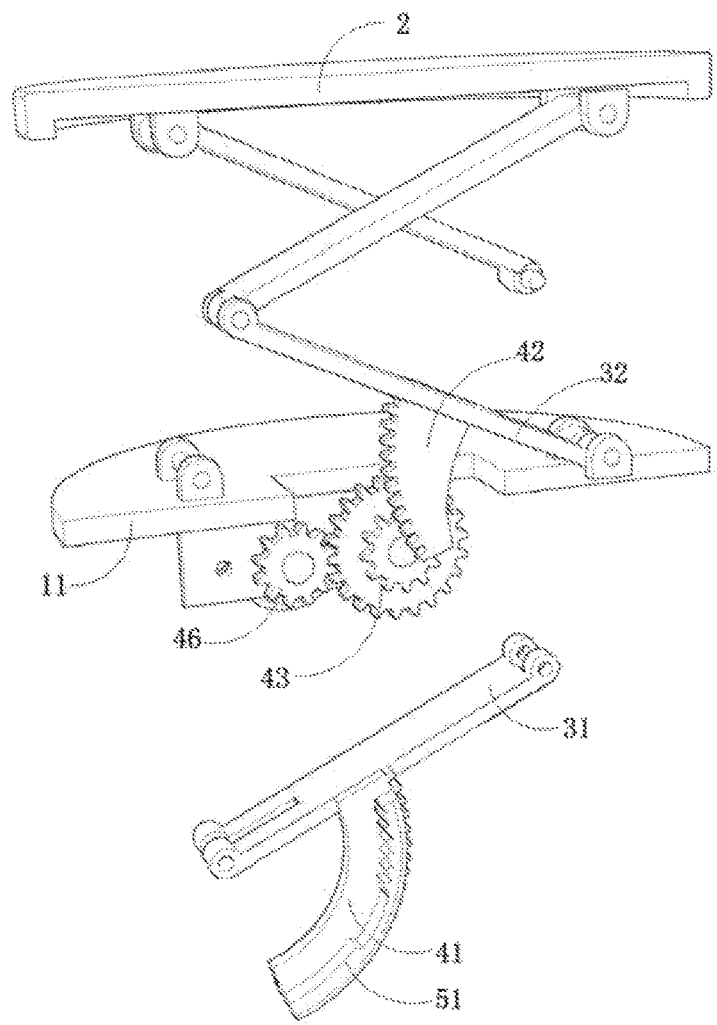
FIG. 12 is an exploded rear perspective view of a front lower folding bar of the invention.
Figure 13:
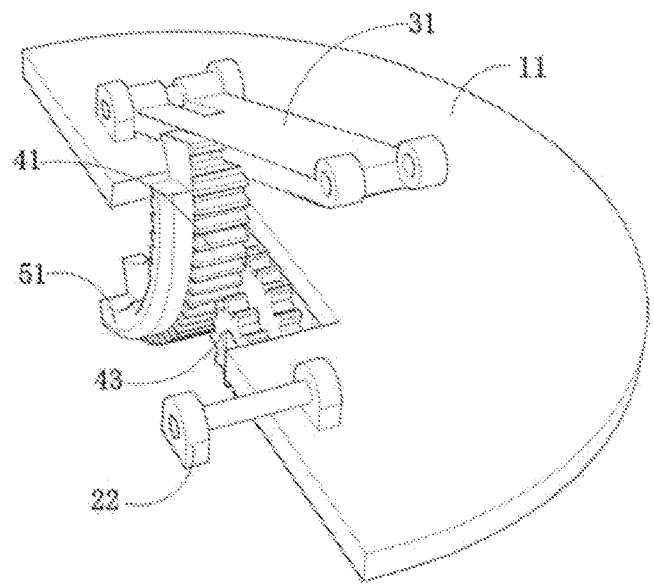
FIG. 13 is a rear side perspective view of a front lower folding bar and part of a synchronous cushioning assembly of the invention.
Figure 14:
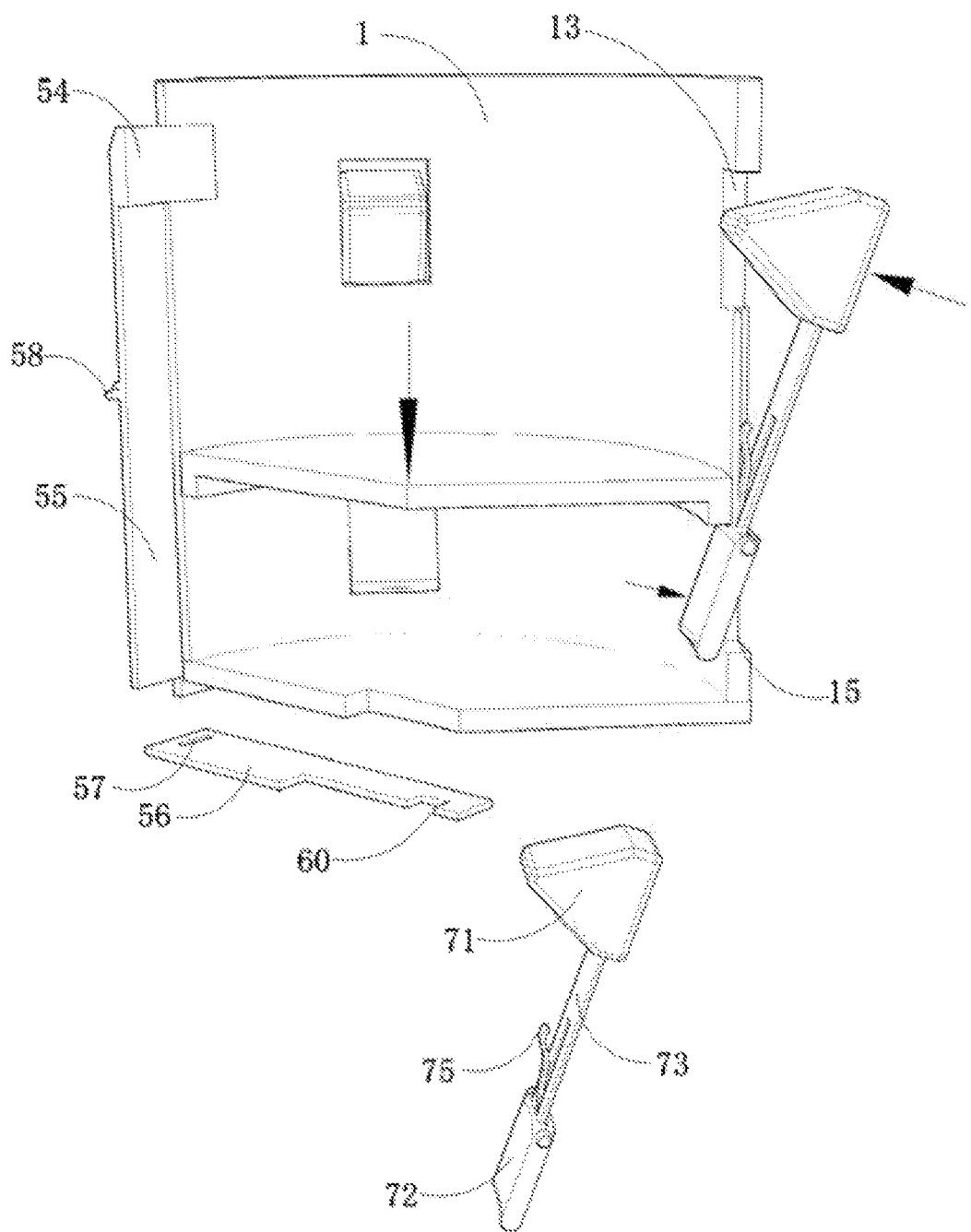
FIG. 14 is a cross-sectional perspective view of a clamping and stabilizing assembly and an outer housing of the invention.

As shown in FIGS. 7, 9, and 12, one side of the outer housing 1 is provided with an internal pressing type stepless locking assembly 5, a ratchet bar 51 is fixedly arranged at a rear side of the first synchronous rack 41 and is arc-shaped, and the arc-shaped ratchet bar 51 and the first synchronous rack 41 have the same circular center, that is, the pivotal connection point between the front lower folding bar 31 and the upper side of the housing bottom 11; and a plurality of limiting ratchet teeth are arranged at an upper end of the ratchet bar 51, an automatic lifting area 52 is arranged under the plurality of limiting ratchet teeth, and a highest limiting buckle 53 is arranged under the automatic lifting area 52.

As shown in FIGS. 8, 9, 10 and 14, a lever groove 17 is formed in one side of the outer housing 1, in which a lever bar 55 is connected through a fulcrum shaft 58, a moving stopper 59 is fixed to a low side of the housing bottom 11, a translational locking bar 56 is movably arranged in the moving stopper 59, and a lock catch 60 for locking the limiting ratchet teeth is arranged at an inner end of the translational locking bar 56; and a lever connection hole 57 is formed in an outer end of the translational locking bar 56, a lower end of the lever bar 55 is inserted into the lever connection hole 57, an internal button 54 is connected to an upper end of the lever bar 55, a return spring 19 is fixedly arranged at an outer side of an upper opening of the outer housing 1 outside the internal button 54, and the return spring 19 keeps ejecting the internal button 54 towards the inside of the outer housing 1.

The arrangement of the plurality of ratchet teeth at the upper end of the ratchet bar 51 allows the translational locking bar 56 connected to the lever connection hole 57 to be moved to the center of the housing bottom 11 by pressing the internal button 54 from inside to outside and using the fulcrum shaft 58 in the lever bar 55 as a fulcrum, so that the lock catch 60 can be separated from the limiting ratchet teeth on the ratchet bar 51, thus realizing automatic lifting. On the contrary, under the action of the return spring 19, automatic locking is realized.

The arrangement of the automatic lifting area 52 and the highest limiting buckle 53 in the ratchet bar 51 allows the automatic lifting height of the lifting supporting plate 2 within a relative height at the lower end in the outer housing 1 to be controlled. When the lifting supporting plate 2 rises to the relative height or approaches the inner button 54, the lock catch 60 will enter the automatic lifting area, and then the inner button 54 can be released. The lifting supporting plate 2 can automatically rise to a required height, and be stopped by means of the highest limiting buckle 53. The inner button 54 does not affect the rising and falling of the lifting supporting plate 2.

The combination of the ratchet bar 51 and the lock catch 60 allows the lifting supporting plate 2 to fall under the action of an external force without being affected, and to be locked and adjusted by means of the internal button 54 and the lock catch 60 in the translational locking bar 56 when automatically rising under the action of the tension spring 35.

As shown in FIGS. 15-19, a push-type stepless locking assembly 6 is arranged at the lower side of the housing bottom 11, which comprises a lever unlocking bar 61 and an unlocking pressing bar 66, a lever mounting rack 67 is fixedly arranged at the lower side of the housing bottom 11, in which a locking bar groove 62 is formed, a movable locking bar 63 is pivotally connected in the locking bar groove 62, and an outer end of the movable locking bar 63 abuts against an upper left side of the big gear; and the movable locking bar 63 is movably and pivotally connected in a locking bar pivotal connection hole 69 provided on the lever mounting rack 67.

A spring wire 65 is obliquely arranged at an upper side of the movable locking bar 63, and the spring wire 65 keeps pressing the outer end of the movable locking bar 63, so as to lock the big gear.

The lever mounting rack 67 is movably sleeved with a lever unlocking bar 61, a mounting rack groove 68 for the lever mounting rack 67 to be sleeved with is formed in the lever unlocking bar 61, one end of the lever unlocking bar 61 abuts against a lower side of the movable locking bar 63, and an unlocking pressing bar 66 is connected to an upper side of the other end of the lever unlocking bar 61.

The lever mounting rack 67, the mechanical mounting rack 12 and the folding pivotal connector 22 can be integrally formed with the outer housing 1 and the housing bottom 11 through injection molding. The movable locking bar 63 is pivotally connected in the locking bar pivotal connection hole 59, and the lever unlocking bar 61 is sleeved in a lever bar pivotal connection hole 64 formed in the lever mounting rack 67.

Figure 15:
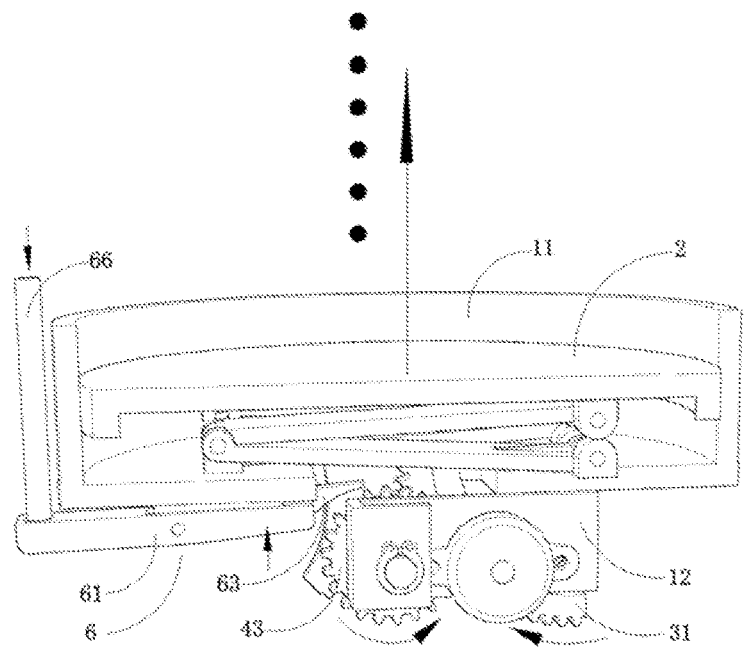
FIG. 15 is a cross-sectional view showing ascending of a push-type stepless locking assembly of the invention after unlocking.

As shown in FIG. 15, when the unlocking pressing bar 66 is pressed down, the inner end of the lever unlocking bar 61 drives the movable locking bar 63 to rise to be separated from the big gear, that is, unlocked, so that the folding assembly can be extended, and the lifting supporting plate 2 automatically rises.

Figure 16:
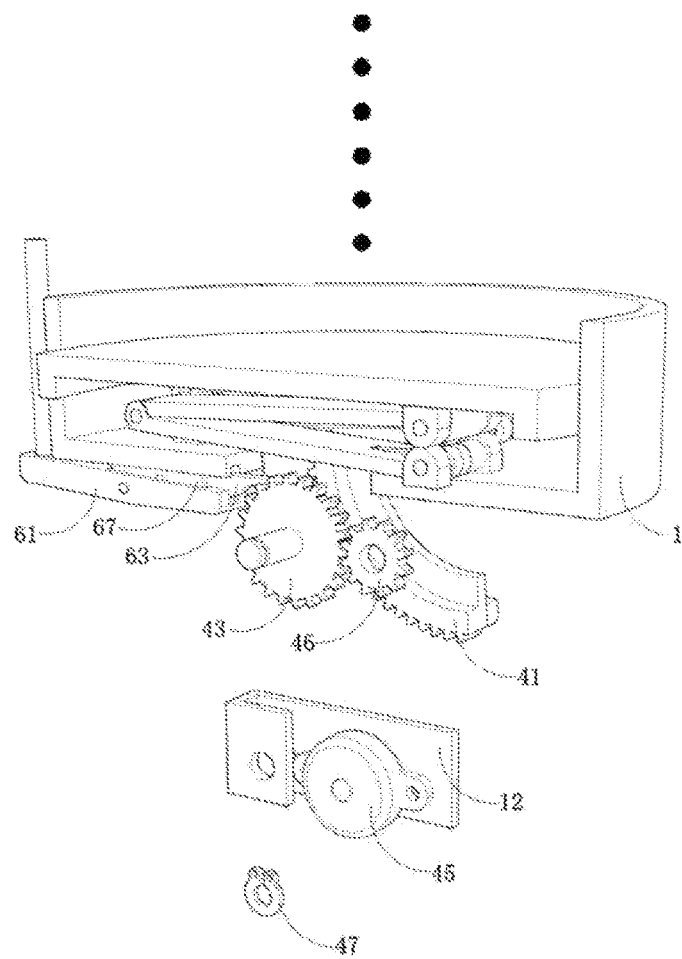
FIG. 16 is a partially exploded perspective view of a push-type stepless locking assembly in a locked state and a cushioning assembly according to the invention.
Figure 17:
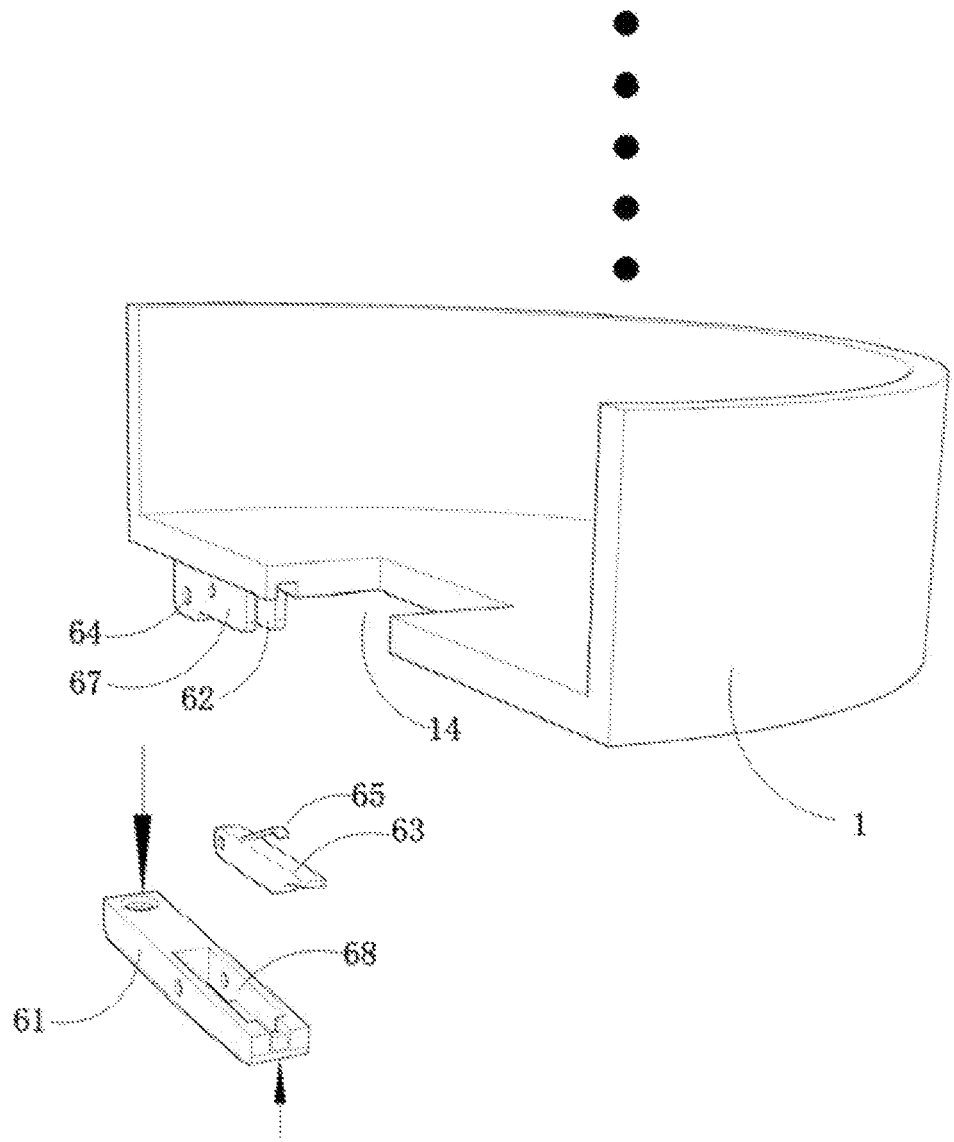
FIG. 17 is a partially exploded perspective view of a push-type stepless locking assembly of the invention.
Figure 18:
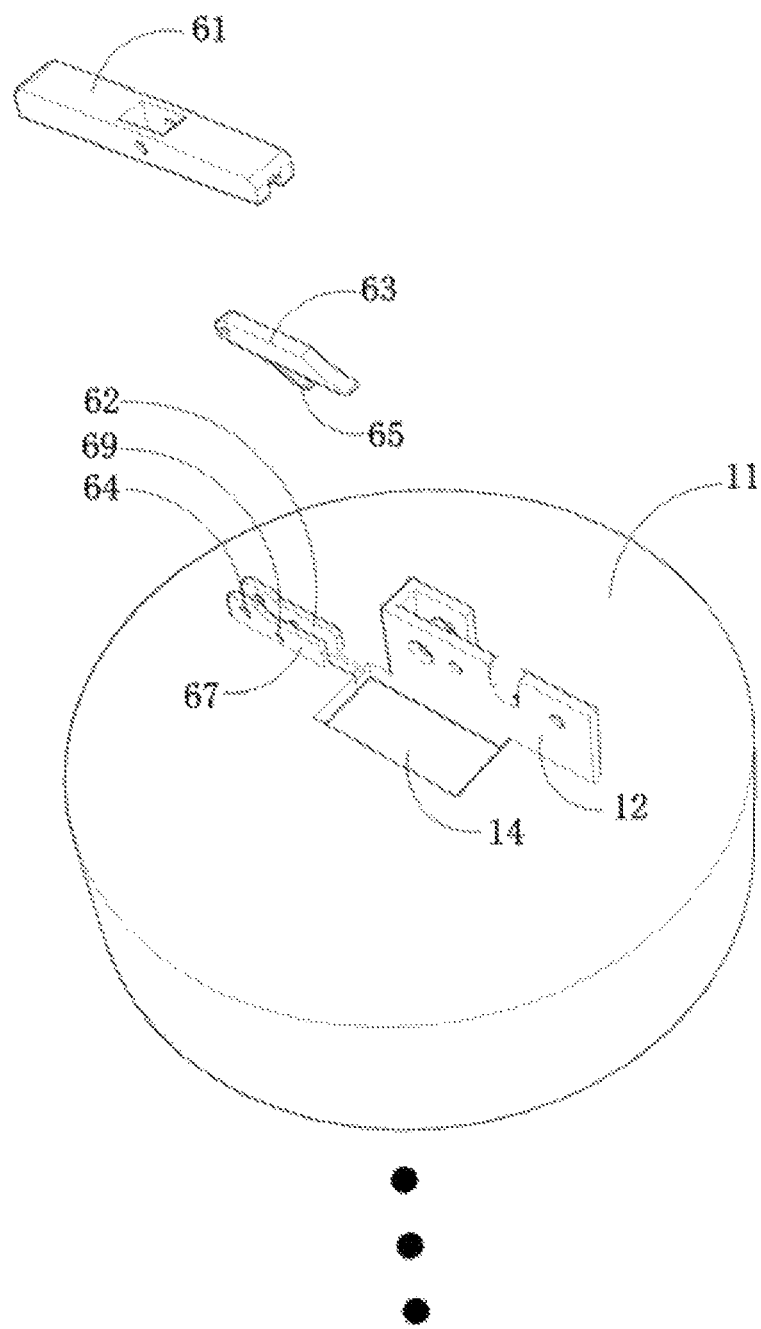
FIG. 18 is a partially exploded bottom perspective view of an outer housing and a push-type stepless locking assembly of the invention.
Figure 19:
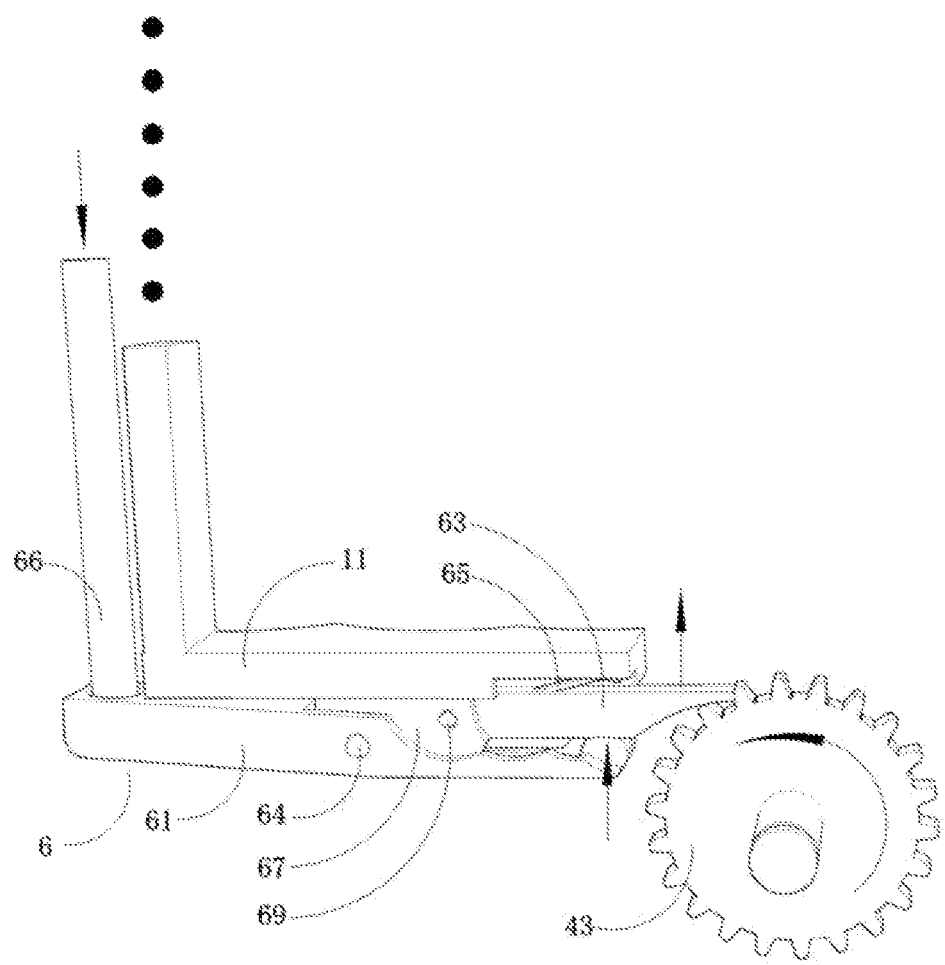
FIG. 19 is a sectional view a push-type stepless locking assembly of the invention in an assembled and unlocked state.

As shown in FIG. 16, when there is no external force, the movable locking bar 63 is pressed downward under the action of the spring wire 65; and as the movable locking bar 63 is arranged at the upper left side of the big gear, the movable locking bar 63 is held when the big gear rotates counterclockwise, that is, in a locked state when there is no external force, but the movable locking bar 63 can rotate smoothly when the big gear rotates clockwise.

That is, the lifting supporting plate 2 can fall smoothly under a downward pressing external force, and can be unlocked and adjusted by means of the unlocking pressing bar 66 when rising automatically.

Only one of the push-type stepless locking assembly 6 or the internal pressing type stepless locking assembly 5 can be provided in one cup holder, as they are two separate technical schemes of a stepless locking assembly in this invention.

As shown in FIG. 1, anti-slip bars 21 are arranged at an upper side of the lifting supporting plate 2. The anti-slip bars 21 not only have an anti-slip effect, but also can prevent the color of the upper side of the lifting supporting plate 2 from getting dull due to friction with a bottom of a cup.

In the above detailed description of the invention, specific examples are used to explain the principle and implementation of the invention. The explanations of the above embodiments are only used to help understand the core idea of the invention, but not to limit the invention. For those of ordinary skill in the art, any modifications, equivalent substitutions and improvements that do not depart from the spirit and principles of the invention should fall within the scope of protection of the claims of the invention.

What is claimed is:

1. A folding lifting device for an automobile, comprising an outer housing, a lifting supporting plate, a folding assembly, and a synchronous cushioning assembly, the outer housing comprising a housing bottom, wherein the lifting supporting plate is movably disposed in the outer housing, and the folding assembly is disposed between a lower side of the lifting supporting plate and an upper side of the housing bottom; the folding assembly is composed of two groups of side V-shaped folding elements which are disposed in a front-rear symmetry manner, and the synchronous cushioning assembly is disposed between lower sides of the two groups of side V-shaped folding elements; each of the two groups of side V-shaped folding elements disposed in the front-rear symmetry manner comprises a front upper folding bar, a front lower folding bar pivotally connected to the front upper folding bar, a rear upper folding bar, and a rear lower folding bar pivotally connected to the rear upper folding bar; upper ends of the front upper folding bar and the rear upper folding bar are pivotally connected to the lower side of the lifting supporting plate, and lower ends of the front lower folding bar and the rear lower folding bar are pivotally connected to the upper side of the housing bottom; and the synchronous cushioning assembly comprises a first synchronous rack and a second synchronous rack, the first synchronous rack is fixedly provided at a rear lower side of the front lower folding bar, the second synchronous rack is fixedly provided at a front lower side of the rear lower folding bar, and the first synchronous rack and the second synchronous rack are the same in tooth model, and are in mutual engagement transmission.

2. The folding lifting device for an automobile according to claim 1, wherein the two groups of side V-shaped folding elements disposed in the front-rear symmetry manner are completely the same, the synchronous cushioning assembly is provided with a speed change gear and a damper, the first synchronous rack is arc-shaped, and a pivotal connection point at the lower end of the front lower folding bar is a circular center of the arc-shaped first synchronous rack; and the second synchronous rack is arc-shaped, a pivotal connection point at the lower end of the rear lower folding bar is a circular center of the arc-shaped second synchronous rack, and the first synchronous rack and the second synchronous rack have the same radius.

3. The folding lifting device for an automobile according to claim 2, wherein tension springs are respectively arranged at pivotal connection positions of the two groups of side V-shaped folding elements disposed in the front-rear symmetry manner, and the tension springs keep the folding elements in an extended state.

4. The folding lifting device for an automobile according to claim 2, wherein a mechanical hole is formed in the housing bottom, a mechanical mounting rack is fixedly arranged in front of the mechanical hole in the housing bottom, and a speed change gear is movably arranged in the mechanical mounting rack; and the speed change gear consists of a pinion and a big gear which are fixedly overlapped, the pinion engages with the first synchronous rack for transmission, and the big gear engages with a damping gear in the damper for transmission.

5. The folding lifting device for an automobile according to claim 1, wherein a plurality of groups of clamping assemblies are regularly arranged around the outer housing, and each of the plurality of groups of clamping assemblies consists of a cup clamp at an upper end, a limiting linkage block at a lower end and a spring connecting bar connecting the cup clamp and the limiting linkage block together; and clamp holes, limiting holes and spring connecting bar grooves are formed in the outer housing corresponding to the clamping assemblies, upper ends of the limiting linkage blocks are pivotally connected to two sides of the limiting holes, stress springs are arranged at lower ends of the spring connecting bars, and the stress springs keep ejecting upper ends of the clamping assemblies outwards.

6. The folding lifting device for an automobile according to claim 2, wherein one side of the outer housing is provided with an internal pressing type stepless locking assembly, a ratchet bar is fixedly arranged at a rear side of the first synchronous rack and is arc-shaped, and the arc-shaped ratchet bar and the arc-shaped first synchronous rack have the same circular center; and a plurality of limiting ratchet teeth are arranged at an upper end of the ratchet bar, an automatic lifting area is arranged under the plurality of limiting ratchet teeth, and a highest limiting buckle is arranged under the automatic lifting area.

7. The folding lifting device for an automobile according to claim 6, wherein a lever groove, in which a lever bar is connected through a fulcrum shaft, is formed in one side of the outer housing, a moving stopper is fixed to a low side of the housing bottom, a translational locking bar is movably arranged in the moving stopper, and a lock catch for locking the limiting ratchet teeth is arranged at an inner end of the translational locking bar; and a lever connection hole is formed in an outer end of the translational locking bar, a lower end of the lever bar is inserted into the lever connection hole, an internal button is connected to an upper end of the lever bar, a return spring is fixedly arranged at an outer side of an upper opening of the outer housing outside the internal button, and the return spring keeps ejecting the internal button towards the inside of the outer housing.

8. The folding lifting device for an automobile according to claim 4, wherein a push-type stepless locking assembly, which comprises a lever unlocking bar and an unlocking pressing bar, is arranged at the lower side of the housing bottom, a lever mounting rack, in which a locking bar groove is formed, is fixedly arranged at the lower side of the housing bottom, a movable locking bar is pivotally connected in the locking bar groove, and an outer end of the movable locking bar abuts against an upper left side of the big gear; and a spring wire is obliquely arranged at an upper side of the movable locking bar, and the spring wire keeps pressing the outer end of the movable locking bar, so as to lock the big gear.

9. The folding lifting device for an automobile according to claim 8, wherein the lever mounting rack is movably sleeved with a lever unlocking bar, a mounting rack groove for the lever mounting rack to be sleeved with is formed in the lever unlocking bar, one end of the lever unlocking bar abuts against a lower side of the movable locking bar, and an unlocking pressing bar is connected to an upper side of the other end of the lever unlocking bar.

10. The folding lifting device for an automobile according to claim 1, wherein anti-slip bars are arranged at an upper side of the lifting supporting plate.

\* \* \* \* \*